United States Patent
Bechamps et al.

(10) Patent No.: US 6,411,766 B1
(45) Date of Patent: Jun. 25, 2002

(54) DEVICES FOR PROTECTING AND ROUTING OPTICAL FIBERS IN A RACK

(76) Inventors: Ronald D. Bechamps, 109 Laurel Dr., Robbinsville, NJ (US) 08691; William S. Leib, III, 47 Wyncrest La., Tinton Falls, NJ (US) 07753

( * ) Notice: Subject to any disclaimer, the term of this patent is extended or adjusted under 35 U.S.C. 154(b) by 0 days.

(21) Appl. No.: 09/414,691

(22) Filed: Oct. 7, 1999

(51) Int. Cl.[7] .................................................. G02B 6/00
(52) U.S. Cl. ....................................... 385/134; 385/135
(58) Field of Search ................................ 385/134, 135, 385/136, 137, 147

(56) References Cited

U.S. PATENT DOCUMENTS

| | | | | |
|---|---|---|---|---|
| 5,640,482 A | * | 6/1997 | Barry et al. ................ | 385/135 |
| 5,913,006 A | * | 6/1999 | Summach .................... | 385/134 |
| 6,044,194 A | * | 3/2000 | Meyerhoefer ............... | 385/134 |

* cited by examiner

Primary Examiner—Frank G. Font
Assistant Examiner—Michael P. Stafira
(74) Attorney, Agent, or Firm—Gaines P. Carter

(57) ABSTRACT

Devices for routing and organizing fibers in a rack that houses optical equipment, including a strain relief member, a chaffing guard, and a sag reducer. The strain relief member includes a body having rounded upper and lower portions, each being at least equal to the minimum bend radius of the fibers exiting the equipment, and fins on top of the body. Fibers can be interference fit between adjacent fins, thereby relieving pressure on the connector caused by gravity when the fiber hangs down over the strain relief member. The chaffing guard includes a body having a rounded upper portion and a rounded lower portion that each maintain the minimum bend radius of fibers routed over the guard. The rounded upper portion has no sharp edges and therefore reduces chaffing of fibers routed over the top of the chaffing guard. The sag reducer includes a spine and a plurality of extending arms that are spaced apart to allow a plurality of fibers to pass between each adjacent arm, thereby reducing the sagging of horizontally routed fibers.

6 Claims, 2 Drawing Sheets

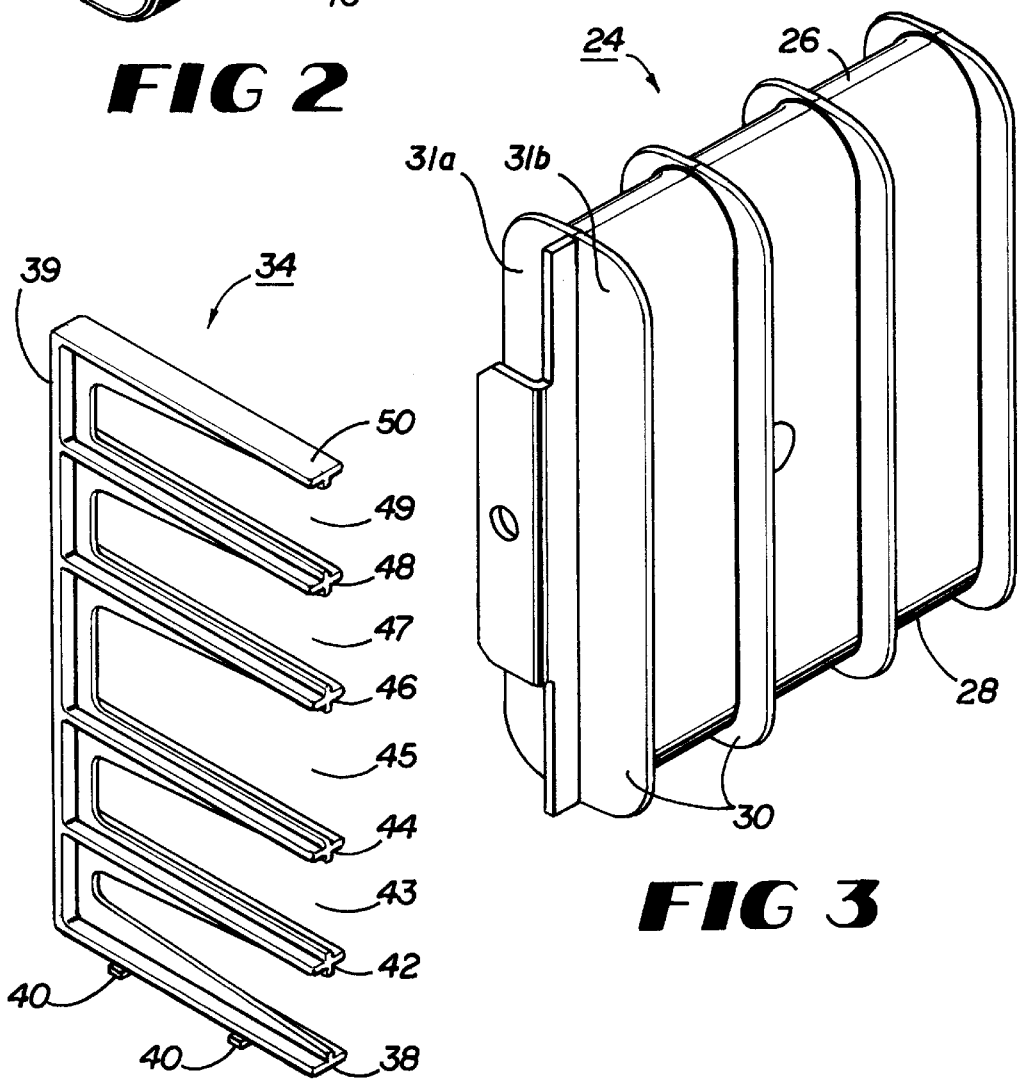

DEVICES FOR PROTECTING AND ROUTING OPTICAL FIBERS IN A RACK

FIELD OF THE INVENTION

The invention relates generally to racks for mounting optical communications equipment, and more specifically, to devices for providing strain relief, maintaining the minimum bend radius, preventing chaffing, and providing sag reduction of fibers in such racks.

BACKGROUND OF THE INVENTION

Communications systems, such as cable television and telephone systems, utilize fiber optics technology. In optical systems, many different types of equipment are utilized, and the various equipment is frequently housed in racks. These racks may house optical equipment such as laser transmitters, optical couplers, splice shelves, and optical pre-termination units, as well as various other types of equipment. The racks typically have a number of rack spaces in which the equipment is mounted, with the rack spaces typically being arranged vertically in the rack. Many different connections are typically made between these various pieces of equipment in a rack, and also between the equipment in the rack and equipment in other racks located nearby. Therefore there are many optical fibers leading to and from the equipment in the rack.

With the many optical fibers connecting equipment in the rack, there is a need to organize the fibers as they run to and from the equipment. Ideally, cabinets should provide protection such as providing strain relief, maintaining the minimum bend radius, preventing chaffing of the fiber, and providing sag reducers for horizontal fiber lengths. Although existing cabinets may provide some of these protections, the devices used to provide such protection have structural and functional drawbacks that often provide inadequate protection.

Therefore, a need exists in the art for devices, for use in a rack, that provide the above protection and organization of optical fibers.

SUMMARY OF THE INVENTION

The present invention includes devices for protecting and routing optical fibers in a rack. The present invention includes a strain relief member. The strain relief member includes a body and strain relief fins on the top of the body. The body has a rounded upper and lower portion, each being at least equal to the minimum bend radius of the fibers exiting the equipment. The strain relief fins are spaced apart on top of the body. The space between the fins is somewhat less than the diameter of an optical fiber, so that an optical fiber must be slightly squeezed between adjacent fins for an interference fit. The interference fit holds the fiber between the fins without degrading the signal, thereby relieving pressure on the connector caused by gravity when the fiber hangs down over the strain relief member.

The present invention also includes a chaffing guard located adjacent to each rack space and located a certain distance from the strain relief member. The location of the chaffing guard defines an inner lane of fiber traffic between the strain relief member and the chaffing guard and an outer lane of traffic between the chaffing guard and the outside of the rack. The chaffing guard includes a body having a rounded upper portion and a rounded lower portion that each maintain the minimum bend radius of fibers routed over the guard. The rounded upper portion not only maintains the minimum bend radius of fibers, but also reduces the effects of chaffing of fibers that are routed over the top of the guard and then downward, because the rounded upper portion has no sharp edge. The chaffing guard also includes a plurality of vertical dividers that create channels to help organize the fibers routed over the guard.

The present invention also includes a sag reducer located in front of the equipment in the rack space. The sag reducer prevents fibers from sagging when they are routed horizontally across the cabinet. The sag reducer includes a spine and a plurality of arms spaced apart to allow a plurality of fibers to pass between each adjacent arm.

BRIEF DESCRIPTION OF THE DRAWINGS

FIG. 2 is a perspective view of the strain relief member in accordance with the present invention.

FIG. 3 is a perspective view of the chaffing guard in accordance with the present invention.

FIG. 4 is a perspective view of the sag reducer in accordance with the present invention.

DETAILED DESCRIPTION

Figure 1:
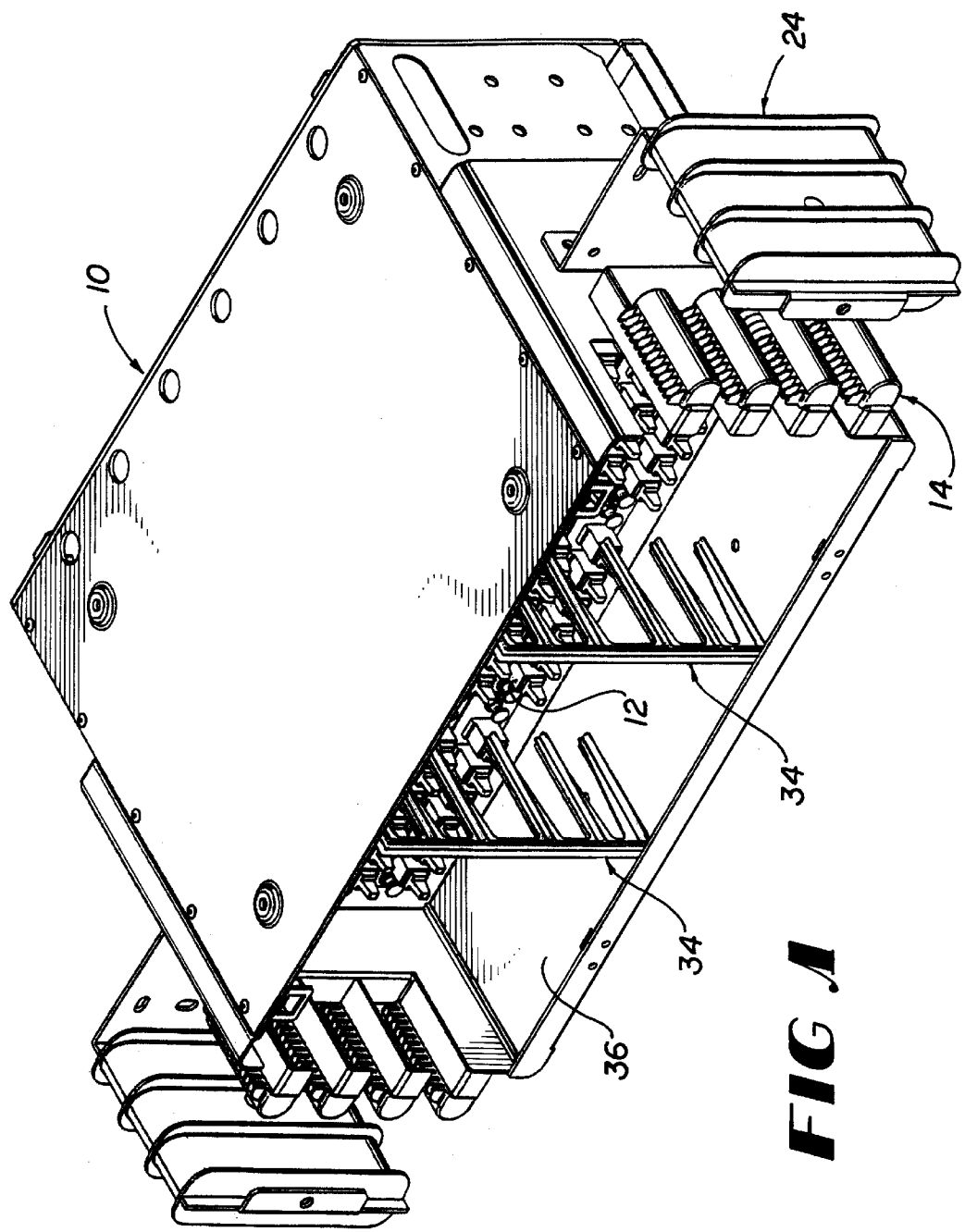
FIG. 1 is a front perspective view of a cabinet for housing optical equipment therein, which shows the strain relief member, bend radius guide, and sag reducer in accordance with the present invention.

The present invention is directed to devices for protecting and organizing optical fibers in a rack. In particular, the present invention provides devices that provide strain relief, prevent chaffing of the fibers, and provide sag reduction for horizontal fiber lengths.

A perspective view of a cabinet in which the present invention is utilized is shown in FIG. 1. The cabinet 10 is typically mounted in a rack which includes a plurality of rack spaces arranged vertically. A cabinet typically has a front face that includes adapters 12 or other connection points to which fibers can be connected. In FIG. 1, the equipment is pre-terminated, which means that fibers from a stub cable have optical connectors thereon that are connected to the back of the equipment. These fibers can then be optically connected to jumpers, which are lengths of optical fibers that have optical connectors on each end, via the adapters 12 on the front face of the equipment. The jumpers can then be routed away from the front face to other equipment either inside or outside the cabinet. Pre-terminated equipment is passive, and such equipment is usually located at the headend of a CATV system (or similarly, at the central office of a telephone system) to distribute the signal output from a laser transmitter.

As partially shown in FIG. 1, the front face of the equipment has four rows of adapters. The adapters function to properly align the optical fibers of each connector connected to the adapter so that the inter-connected fibers are properly aligned, thereby minimizing signal loss and noise. Because multiple fibers can be connected to the plurality of adapters on the front face of each piece of equipment in the rack, many fibers are routed throughout the rack. Therefore, the need to organize the fibers in some manner is required to prevent the numerous different fibers from becoming tangled or otherwise unmanageable.

A fiber organization region is provided in the rack, preferably on each side of each rack space, in which fibers are routed up or down between equipment. It should be understood that for purposes of this disclosure, the term "fiber" is meant to encompass fiber optic cable having multiple fibers therein, as well as individual optical fibers, pigtails, jumpers, or any other type of medium for carrying optical signals. However, the present invention may also be used in applications other than a fiber optic application, so the term "fiber" may also encompass other signal transmission media, such as coaxial cable and other electrical cables. The organization region provides adequate space for organizing the fibers that enter and exit the various equipment in the rack. As will be explained below, the organization region provides for two lanes of fiber traffic.

The present invention includes a strain relief member 14. Preferably, a strain relief member is provided on each side of the equipment adjacent to each row of adapters on the front face of the equipment, so that a separate strain relief member can handle the fibers from each row of adapters. In the exemplary rack shown in FIG. 1, there are four strain relief members adjacent the rack space because there are four rows of adapters on the equipment. The strain relief member 14, as also shown in FIG. 2, includes a body 16 and slots defined by strain relief fins 18 on the top of the body. The body has a rounded side portion 17 having an upper portion 19 and a lower portion 20. As shown in FIG. 2, both the upper portion 19 and lower portion 20 of the side portion are curved and each has a radius that is at least the minimum bend radius of the fibers in the rack. In this manner, fibers routed over the top of the body and then downward are prevented by the upper portion 19 from being bent beyond their minimum bend radius. Similarly, fibers routed under the body and then upward are prevented by the lower portion 20 from being bent beyond their minimum bend radius.

The strain relief fins 18 are spaced apart on top of the body 16, thereby defining a plurality of slots between adjacent fins. The space between the fins is somewhat less than the diameter of an optical fiber, so that an optical fiber must be slightly squeezed between adjacent fins for an interference fit. The interference fit holds the fiber between the fins without degrading the signal, thereby relieving tension on the connector caused by gravity when the fiber is routed downwardly in the rack. In this manner, the strain is removed from the connector and transferred to the fins, which protects the integrity of the connector. The fins are tall enough such that two fibers can be inserted therein, one stacked on top of the other. No fins are provided on the bottom of the strain relief member because when a fiber is routed upwardly in the rack, gravity does not act to put a strain on the upwardly-routed fiber, and therefore no strain relief is required.

The present invention also includes a chaffing guard 24 that is located adjacent to each rack space and is located a certain distance from the strain relief members associated with a rack space. The location of the chaffing guard defines an inner lane of fiber traffic between the strain relief members and the chaffing guard and an outer lane of traffic between the chaffing guard and the outer wall of the rack (not shown). The benefit of providing two lanes of fiber traffic is that fibers can be routed around the chaffing guard to the outer lane and thereby be removed from the inner lane where there may be fiber congestion from the many fibers entering and exiting rack spaces.

The chaffing guard 24 includes a body having a rounded upper portion 26 and a rounded lower portion 28. Each of the rounded upper portion 26 and the rounded lower portion 28 has a radius that is at least the minimum bend radius of the fibers in the rack, thereby ensuring that when a fiber is routed over or under the chaffing guard, the fiber will not be bent beyond its minimum bend radius. The rounded upper portion 26 not only maintains the minimum bend radius of fibers, but also reduces chaffing of fibers that are routed over the top of the guide and then downward. As is well known in the art, chaffing can cause the outer jacket of optical fibers to be cut or worn away, thereby causing signal degradation. In prior racks, the present chaffing guard was not used, but instead a flat metal plate was oriented vertically adjacent to a rack space. In these prior racks, when fibers were routed over the top of the plate and then downward, gravity caused chaffing of the optical fibers on the top edge of the metal plate. The rounded upper portion 26 of the chaffing guard 24 of the present invention solves this problem. The chaffing guard also includes a plurality of vertical dividers 30 that create channels to help organize the fibers that are routed over the guard.

The chaffing guard 24 is preferably located in the rack such that the upper portion 26 of the guard is approximately level with the top of the uppermost strain relief member associated with a particular piece of equipment. It will be understood that a fiber routed from the front face of the equipment is first routed over or under a strain relief member 14, and then can be routed over or under the chaffing guard 24, if the fiber is to be routed up or down, respectively, in the outer traffic lane. If the fiber is not to be routed in the outer lane, then the fiber need not be routed over the chaffing guard, and the fiber can be routed up or down using only a strain relief member 14.

The chaffing guard, as shown in FIGS. 1 and 3, is preferably constructed of two plastic halves that are mated together. Halves 31a and 31b are preferably identical, and are formed such that one half can be turned 180 degrees and mated with the other half. Therefore, the halves of the chaffing guide can be constructed from a single mold, thereby simplifying the manufacturing process.

The present invention also includes a sag reducer 34 located in front of the front face of the equipment, such as on a lower horizontal panel 36 adjacent the front face of the equipment, as shown in FIG. 1. The sag reducer 34 reduces the sagging of fibers when they are routed horizontally across the rack space. Preferably, two sag reducers are provided for each rack space, as shown in FIG. 1. Each sag reducer, as shown in FIGS. 1 and 3, preferably includes a bottom 38 having tabs 40 extending therefrom that can be inserted into corresponding holes in the horizontal panel in front of the equipment. Each sag reducer has a spine 39, and a plurality of generally horizontally-extending arms 42, 44, 46, and 48 spaced apart to allow a plurality of fibers to pass between each adjacent arm. In the preferred sag reducer shown in FIGS. 1 and 3, there are four fiber paths 43, 45, 47, and 49 provided by the respective arms. A separate fiber path is provided for each row of adapters on the front face of the equipment. A top arm 50 is also provided.

While the preferred embodiments of the invention have been shown and described, it will be obvious to those skilled in the art that various modifications and alterations can be made thereto without departing from the spirit and scope of the invention as defined in the appended claims.

What is claimed is:

1. An apparatus for organizing optical fibers in a rack having a plurality of rack spaces in which equipment is housed, comprising:

a strain relief member located adjacent to a rack space, said strain relief member including:
  a body having a top and a rounded side having a curved upper portion and a curved lower portion, wherein each of said upper portion and lower portion has a radius that is at least the minimum bend radius of the optical fibers in the rack;

a plurality of fins extending from the top of the body, wherein adjacent fins are spaced apart slightly less than the width of the optical fibers so that the optical fibers can be retained between adjacent fins by an interference fit such that the strain on said optical fibers is absorbed by said fins.

2. The apparatus of claim 1 wherein the equipment has a front face having a plurality of adapters thereon arranged in a plurality of rows, and wherein a separate strain relief member is provided for each row of adapters.

3. The apparatus of claim 1 wherein said fins are tall enough so that two fibers can be retained therebetween by stacking one fiber on top of the other fiber.

4. The apparatus of claim 1 further comprising a chaffing guard located adjacent to a rack space and a predetermined distance from said strain relief member such that an inner lane of fiber traffic is defined between said strain relief member and said chaffing guard, and an outer lane of fiber traffic is defined between said chaffing guard and the outside of the rack.

5. The apparatus of claim 4 wherein said chaffing guard has an upper portion and a lower portion, each of which is curved such that the radius of the curve is at least the minimum bend radius of the fibers in said rack.

6. The apparatus of claim 5 wherein the upper portion of said chaffing guard is located approximately level with the uppermost strain relief member for a particular rack space.

* * * * *